April 7, 1970  E. J. BOZEWICZ  3,504,789

THERMOSETTING ADHESIVE BONDED WRAPPER

Filed June 27, 1968

INVENTOR.
EDWIN J. BOZEWICZ
BY
Edward M. Farrell
ATTORNEY

United States Patent Office 3,504,789
Patented Apr. 7, 1970

3,504,789
THERMOSETTING ADHESIVE BONDED WRAPPER
Edwin J. Bozewicz, Mount Holly, N.J., assignor to The Budd Company, Philadelphia, Pa., a corporation of Pennsylvania
Filed June 27, 1968, Ser. No. 740,611
Int. Cl. B65d *85/67;* B65h *75/00*
U.S. Cl. 206—59      5 Claims

ABSTRACT OF THE DISCLOSURE

An adhesive tape includes a main non-porous body having a thin layer of resin on one side and a catalyst on the other side. In a roll, the two sides are separated by a paper or insulating material therebetween. Upon wrapping an article, the top surface contacts the bottom surface and a thermosetting reaction takes place.

---

Adhesive tapes are well known and have taken a wide variety of forms. There are many applications for tapes which must be durable when subject to vary high temperatures. In general, such tapes require special steps and materials to apply. For example, a number of operations are generally required in the field involving the application of the adhesive, subjecting the adhesive to moisture or another material, applying the tape to the apparatus involved and finally subjecting the tape to heat and pressure after it has been applied. All of this takes much time and trouble.

Double coated tapes have been used in the past. In these cases, tapes have had adhesive coated on both sides of the main body or backing and sometimes have been wound with a liner interwound in the roll to keep the two sides separated. In most cases, the double coated tape has been coated with a water dispersible adhesive. In the cases where the opposing sides have included pressure sensitive adhesives, the tapes are effective in bonding the two surfaces, in effect providing a better adhesive bond. However, in the latter case the degree of adhesiveness attained is not effective in forming a thermoset bond capable for use with high temperatures and other special applications.

It is desirable in many cases to have a tape wherein the surfaces are dry and which is capable of being applied easily without any additional steps required after application. This would preclude the necessity for the application of heat and pressure or the adidtion of any liquids to the tape to attain good thermosetting properties.

It is an object of this invention to provide an improved tape.

It is a further object of this invention to provide an improved tape having adhesive qualities and which may be stored for relatively long periods without such qualities being affected.

It is still a further object of this invention to provide an improved tape capable of being used with high temperatures.

It is a further object of this invention to provide an improved tape for use in quick practical field repairs where curing at room temperature is desired.

It is still a further object of this invention to provide an improved tape useful for wrapping unwieldly apparatus where thermoset curing is required.

In accordance with the present invention a tape includes a non-porous main body which is coated on one side with a thin layer of resin capable of being cured. The other side is then coated with a converting agent or catalyst capable of reacting with the resin. An interleaving sheet of release paper prevents the two sides from contacting each other. When the tape is unrolled so that one side contacts the other side a thermosetting reaction takes place between the resin and the catalyst.

Figure 1:
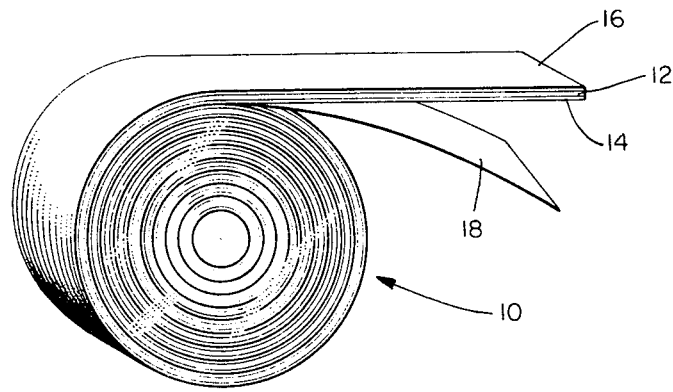
Figure 2:
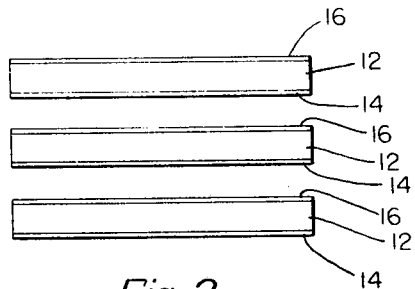
Figure 3:
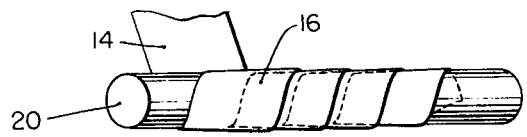

Other objects and advantages of the present invention will be apparent and suggest themselves to those skilled in the art, from a reading of the following specification and claims, in conjunction with the accompanying drawing, in which:

FIG. 1 respresents a roll of tape, in accordance with the present invention;

FIG. 2 is a cross sectional view of pieces of the tape to illustrate relationship between the two sides of the tape after it has been applied, and FIG. 3 is a view showing the tape wrapped around an article, in accordance with the present invention.

Referring particularly to FIG. 1, a roll of tape 10 includes a main non-porous body 12 which may be metal foil, nylon or any other electrical or thermal insulation. Resin 14 is coated on one side of the tape with the other side coated with a converting agent or catalyst 16. An interleaving sheet of paper 18 is disposed between the strips of tape to prevent the bottom part of the tape from contacting the top part of the tape. The resin is the type capable of reacting with the catalyst to provide a thermosetting reaction.

As long as the two sides of the tape do not contact each other, no reaction takes place. However, once the tape is applied to an article and the strips of tape are built up one over the other in a standard build-up or wrapped in an overlapping manner to resemble a spiral tube, the top surface of the tape will be in intimate contact with the bottom surface of the tape. If the built-up product can be held until a reaction between the resin and the catalyst takes place, little heat is required. Various means may be employed to hold the material in place until the thermosetting reaction takes place.

Non-liquid systems, that is, epoxies and converting agents that are solid at room temperature are most practical in practicing the present invention. The type of resins employed may take a wide varety of forms. For example, bisphenol type epoxy resin could be used. These resins are available commercially and are sold under the trade names Dow 661 or Epon 1001. In some cases acrylic resins may be used with a suitable catalyst.

The catalyst may include any one of a number of polyamides. Also, many polyamines that would initiate the polymerization of the base resin could be used. For example, a resin sold under the trade name of General Mills known as Versamid 140 could be used. When the catalyst contacts the resin, a thermosetting reaction takes place.

As mentioned, it may be necessary in some cases to hold the tape in place until the reaction takes place. A tackifying agent could be used for this purpose. Again this agent could be a polyamide or a polyamine. One such product sold commercially is a product known as Versamid 940 which is a trademark of General Mills. This product is a hot tacky adhesive capable of holding a wrapper together until a thermosetting reaction takes place.

In one practical application a five millimeter thick nylon paper was painted on one surface with Dow 661. The other side was painted with a solution of ten parts Versamid 940 and twenty parts Versamid 140. Both sides were given a short oven time to remove solvent and wrapped with an interleaving sheet of crepe paper. The Versamid 140 reacts with the Dow 661 to form a thermosetting bond. The Versamid 940 holds the wrapper together but in some cases may also form part of the catalyst which reacts with the resin to form the thermosetting bond.

FIG. 2 represents the relative positions of the top surface of the tape with respect to the bottom surface after the tape has been installed.

Referring particularly to FIG. 3, a coil of tape is wrapped around in an overlapping manner onto a metal rod 20. After the reaction of the catalyst and resin the tape cannot be torn apart.

While the subject invention is particularly applicable to situations which do not require heat or pressure, it is apparent that if it is desired to speed up the thermosetting operation that some heat and pressure may be applied. It is also apparent that the tackifying agent may be on either side of the tape. However, if the tackifying agent is put on the side of the resin, it must be of the type which will not cause a thermosetting reaction to take place.

The subject invention may be used in many applications including electrical and thermal insulation. Also, the tape may be used as mechanical support for various items. The ease of appilcation makes the present invention especially useful and adaptable for use in the field as it does not require any heat or pressure for application.

If desired, a coating of material may be applied to the tape after installation. This is in the event that the installation prohibits the exposure of any portion of uncured material. This does not affect the tape after it has been applied.

What is claimed is:

1. A roll of adhesive tape comprising a main non-porous body, a coating of dry epoxy resin on one side of said body capable of reacting with a catalyst to produce a thermosetting reaction, a mixture of a catalyst and a tackifying material coated on the opposite side of said body capable of reacting with said resin to produce a thermosetting reaction, said tackifying material holding said tape in position when it is unrolled onto an object until said thermosetting reaction takes place, and an insulating sheet interleaved in said roll to prevent said resin from contacting said catalyst.

2. The invention as set forth in claim 1 wherein ten parts of said tackifying material is mixed with twenty parts of said catalyst.

3. The invention as set forth in claim 1 wherein said catalyst comprises resins from the polyamide group.

4. The invention as set forth in claim 3 wherein said epoxy resin includes Bisphenol A type resins.

5. The invention as set forth in claim 4 wherein said main non-porous body is made of nylon.

References Cited

UNITED STATES PATENTS

| | | | |
|---|---|---|---|
| 2,109,583 | 3/1938 | Bennett. | |
| 2,596,136 | 5/1952 | Ernst. | |
| 2,622,656 | 12/1952 | Pinsky | 206—59 |
| 2,907,682 | 10/1959 | Eichel | 206—59 |
| 3,001,213 | 9/1961 | Stark et al. | 117—68 |
| 3,351,515 | 11/1967 | Muttera | 206—59 |

WILLIAM T. DIXSON, JR., Primary Examiner

U.S. Cl. X.R.

117—68.5